US011866957B2

(12) United States Patent
Dennes et al.

(10) Patent No.: US 11,866,957 B2
(45) Date of Patent: Jan. 9, 2024

(54) LOCK HOUSING DEVICE AND KEY STRUCTURE

(71) Applicant: INTERNATIONAL BUSINESS MACHINES CORPORATION, Armonk, NY (US)

(72) Inventors: Albert Dennes, Tucson, AZ (US); Junfeng Xu, Tucson, AZ (US); Adam Mullenbach, Tucson, AZ (US); Gregory Michael Ketterer, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 17/086,504

(22) Filed: Nov. 2, 2020

(65) Prior Publication Data

US 2022/0136282 A1 May 5, 2022

(51) Int. Cl.

*E05B 35/00* (2006.01)
*E05B 47/00* (2006.01)

(52) U.S. Cl.

CPC ........ *E05B 35/001* (2013.01); *E05B 47/0001* (2013.01); *E05B 2047/0088* (2013.01); *E05Y 2400/44* (2013.01); *E05Y 2400/612* (2013.01)

(58) Field of Classification Search

CPC ............... E05B 35/001; E05B 47/0001; E05B 2047/0088; E05Y 2400/44; E05Y 2400/612

See application file for complete search history.

(56) References Cited

U.S. PATENT DOCUMENTS 2,057,301 A * 10/1936 Golokow ................ E05B 45/10 200/61.66
3,639,906 A * 2/1972 Tritsch ................. G07C 9/0073 340/5.67

(Continued)

FOREIGN PATENT DOCUMENTS

CH 449456 A 12/1967
CN 201236540 U 5/2009

(Continued)

OTHER PUBLICATIONS

Notification of Transmittal of the International Search Report and the Written Opinion of the International Searching Authority, Applicant's file reference: IEE210824PCT, International application No. PCT/CN2021/125168, International filing date: Oct. 21, 2021, dated Jan. 19,2022, Date of the actual completion of the International search: Jan. 7, 2022, pp. 1-10.

(Continued)

*Primary Examiner* — Mark A Williams
(74) *Attorney, Agent, or Firm* — Tihon Poltavets

(57) ABSTRACT

An apparatus includes an enclosure, a central processing unit, a power source, a first distance measuring device, a first compressible member, and a first housing pin, where the central processing unit is electrically coupled to the power source and the first distance measuring device. A first end of the first compressible member is mechanically coupled to a first end of the first housing pin and a second end of the first compressible member is mechanically coupled to an inner surface of the enclosure. The first distance measuring device positioned at the second end of the first compressible member, where the first distance measuring device is configured to measure a first distance to the first end of the first housing pin. A first key pin of a key structure disposed in the (Continued)

enclosure, where the first key pin is configured to compress the first compressible member the first distance.

14 Claims, 7 Drawing Sheets

(56) References Cited

U.S. PATENT DOCUMENTS

| | | | | |
|---|---|---|---|---|
| 4,432,142 | A * | 2/1984 | Korsak | E05B 19/0011 33/564 |
| 4,433,487 | A * | 2/1984 | Roland | E05B 17/0016 70/358 |
| 4,656,851 | A * | 4/1987 | Leek | E05B 45/10 70/DIG. 49 |
| 4,856,309 | A | 8/1989 | Eizen | |
| 6,550,299 | B1 | 4/2003 | Lin | |
| 9,567,770 | B1 * | 2/2017 | Ginos | E05B 27/006 |
| 10,415,269 | B2 * | 9/2019 | Holmes | E05B 27/0082 |
| 2011/0083479 | A1 * | 4/2011 | Hsu | E05B 27/083 70/57.1 |
| 2011/0132050 | A1 | 6/2011 | McCaffrey | |
| 2020/0256089 | A1 * | 8/2020 | Pfunder | E05B 19/0011 |

FOREIGN PATENT DOCUMENTS

| | | | |
|---|---|---|---|
| CN | 105370109 | A | 3/2016 |
| CN | 106437300 | A | 2/2017 |
| CN | 105507672 | B | 12/2017 |
| CN | 107795197 | A | 3/2018 |
| CN | 109209031 | A | 1/2019 |
| GB | 2495321 | A | 11/2011 |
| WO | 2022089282 | A1 | 5/2022 |

OTHER PUBLICATIONS

Boros et al., “Mechanical characteristics of cylinder pin tumbler locks as they relate to resistance testing”. Communications-Scientific letters of the University of Zilina, (Jun. 2018). 20(2), pp. 96-101.

* cited by examiner

LOCK HOUSING DEVICE AND KEY STRUCTURE

BACKGROUND

This disclosure relates generally to lock and key combinations, and in particular, to a lock housing device and key structure combination for controlling a locking mechanism.

Presently, various mechanical and electronic locking devices include a lock and key combination for securing various items. A lock represents a mechanical and/or electronic fastening device that is released by an object (e.g., keycard), by supplying a unique identification information (e.g., pin code), or a combination of the two. A key represents a physical device utilized to operate the lock to gain access to an item that the lock secures.

SUMMARY

One aspect of an embodiment of the present invention discloses an apparatus for a lock housing device and key structure, the apparatus comprising an enclosure, a central processing unit, a power source, a first distance measuring device, a first compressible member, and a first housing pin, wherein the central processing unit is electrically coupled to the power source and the first distance measuring device. The apparatus further comprising a first end of the first compressible member mechanically coupled to a first end of the first housing pin and a second end of the first compressible member mechanically coupled to an inner surface of the enclosure. The apparatus further comprising the first distance measuring device positioned at the second end of the first compressible member, wherein the first distance measuring device is configured to measure a first distance to the first end of the first housing pin. The apparatus further comprising a first key pin of a key structure disposed in the enclosure, wherein the first key pin is configured to compress the first compressible member the first distance.

Another aspect of an embodiment of the present invention discloses a method for a lock housing device authenticating a key structure, the method comprising determining, by one or more processors, a lock housing device is in contact with a key structure, wherein a first key pin of the key structure compresses a first compressible member in the lock housing device. The method further comprising, receiving, by one or more processors, from a first distance measuring device, a first distance value for a first compression length of the first compressible member in the lock housing device. The method further comprising, responsive to determining the first compression length of the first compressible member matches a first known compression length, instructing, by one or more processors, a locking mechanism associated the lock housing device to deactivate.

BRIEF DESCRIPTION OF THE SEVERAL VIEWS OF THE DRAWINGS

The following detailed description, given by way of example and not intended to limit the disclosure solely thereto, will best be appreciated in conjunction with the accompanying drawings, in which.

DETAILED DESCRIPTION

Figure 1:
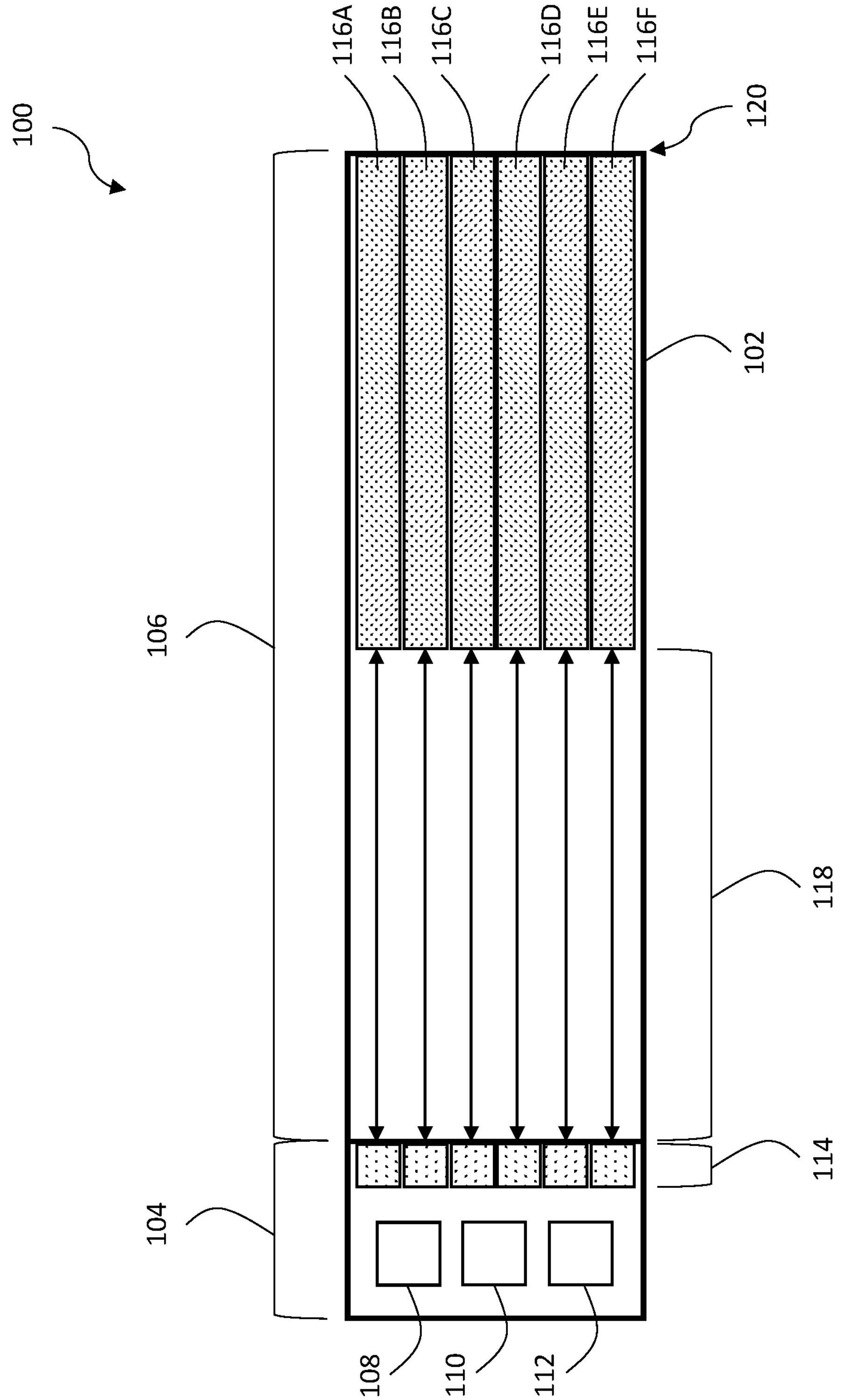
FIG. 1 depicts a side view of a lock housing device, in accordance with an embodiment of the present invention.

Embodiments of the present invention provide a lock housing device and a key structure, where the key structure is insertable into the lock housing device. One or more housing pins of the lock housing device at least partially align with one or more key pins of the key structure, where the one or more housing pins are compressible within the lock housing device by the one or more key pins of the key structure. The lock housing device includes a central processing unit, a communication device, a power source, and one or more distance measuring devices for the one or more housing pins of the lock housing device. The central processing unit utilizes the one or more distance measuring devices to measure a compression length of the one or more housing pins and a key verification program compares the compression length to known length to authenticate the key structure with the one or more key pins. For a secondary authentication, a current is supplied from the power source of the lock housing device to the one or more key pins of the key structure composed of various metal types, where the current is passed to the one or more housings pins of the lock housing device and grounded to the CPU. The key verification program compares resistance values for the one or more key pins of the key structure to the known resistance values to further authenticate the key structure with the one or more key pins.

Detailed embodiments of the present invention are disclosed herein with reference to the accompanying drawings; however, it is to be understood that the disclosed embodiments are merely illustrative of potential embodiments of the invention and may take various forms. In addition, each of the examples given in connection with the various embodiments is also intended to be illustrative, and not restrictive. This description is intended to be interpreted merely as a representative basis for teaching one skilled in the art to variously employ the various aspects of the present disclosure. In the description, details of well-known features and techniques may be omitted to avoid unnecessarily obscuring the presented embodiments.

For purposes of the description hereinafter, terms such as "upper", "lower", "right", "left", "vertical", "horizontal", "top", "bottom", and derivatives thereof shall relate to the disclosed structures and methods, as oriented in the drawing figures. Terms such as "above", "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements. The term substantially, or substantially similar, refer to instances in which the difference in length, height, or orientation convey no practical difference between the definite recitation (e.g. the phrase sans the substantially similar term), and the substantially similar variations. In one embodiment, substantial (and its derivatives) denote a difference by a generally accepted engineering or manufacturing tolerance for similar devices, up to, for example, 10% deviation in value or 10° deviation in angle.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

FIG. 1 depicts a side view of a lock housing device, in accordance with an embodiment of the present invention. In this embodiment, lock housing device 100 includes a cylindrical shaped enclosure 102, where enclosure 102 further includes electronic enclosure 104 and pin enclosure 106. FIG. 1 illustrates a cutaway lengthwise along a diameter of lock housing device 100, discussed in further detail with regards to axis 302 in FIG. 3A. Central processing unit (CPU) 108, communication module 110, power source 112, and distance measuring devices 114 are disposed in electronic enclosure 104, where power source 112 is electrically coupled to CPU 108, communication module 110, and distance measuring devices 114. CPU 108 is also electrically coupled to communication module 110 and distance measuring device 114. Housing pins 116A-116F and compressible members 118, where a first end of each housing pin 116A-116F is mechanically coupled to a first end of each compressible member 118 and a second end of each compressible member 118 is mechanically coupled to an inner surface of pin enclosure 106. Each housing pin 116A-116F is enclosed in a corresponding cylindrical housing (not illustrated in FIG. 1) for guiding the movement of each housing pin 116A-116F as a corresponding compressible member 118 compresses and rebounded. Key structure 200, not illustrated in FIG. 1 and discussed in further detail with regards to FIG. 2, is insertable and removable at area 120 of enclosure 102 of lock housing device 100.

CPU 108 utilizes measuring device 114 to determine a length due to compression of each compressible member 118 for each corresponding housing pin 116A-116F. In this embodiment, housing pins 116A-116F are in an initial state and each compressible member 118 is at an initial length, where each compressible member 118 is not experiencing compression due to a force being applied to a second end of each housing pin 116A-116F at area 120 opposite the first end of each housing pin 116A-116F. Each of measuring device 114 can be a laser measuring distance based on a light pulse leaving each of measuring device 114, reflecting off the first end of each corresponding housing pin 116A-116F, and receiving the reflected light at each measuring device 114. Each compressible member 118 can be a helical spring, where the light pulse emitted by measuring device 114 travels through a central axis of the helical spring for each compressible member 118. Communication module 110 allows for CPU 108 to communication with one or more external electronic device (e.g., a client device, an electronic lock mechanism) to provide information regarding an authentication of a key structure inserted into lock housing device 100. Power source 112 can be a rechargeable battery providing energy to CPU 108, communication module 110, and measuring devices 114.

Figure 2:
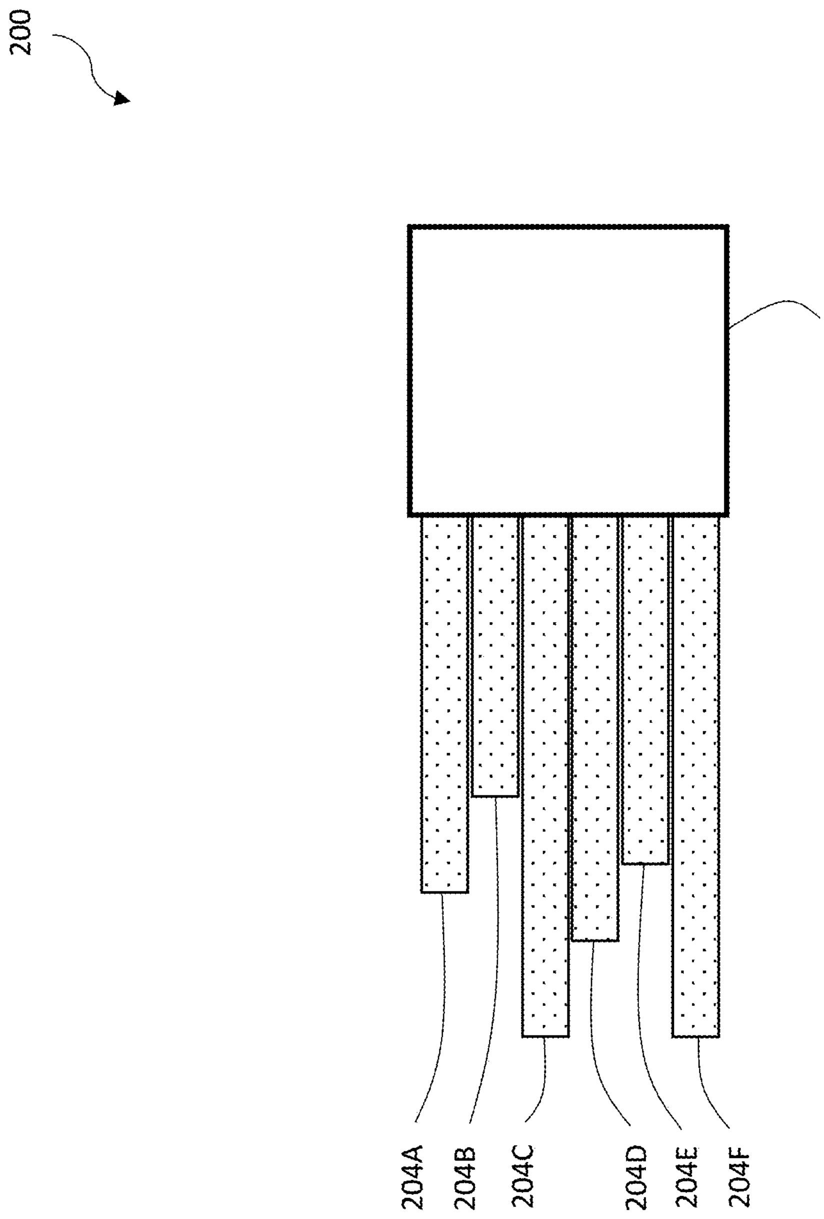
FIG. 2 depicts a side view of a key structure for insertion into a lock housing device, in accordance with an embodiment of the present invention.

FIG. 2 depicts a side view of a key structure for insertion into a lock housing device, in accordance with an embodiment of the present invention. In this embodiment, key structure 200 includes handle portion 202, where key pins 204A-204F protrude from a first end of handle portion 202. FIG. 2 illustrates a cutaway lengthwise along a diameter of key structure 200, discussed in further detail with regards to axis 304 in FIG. 3B. Each key pin 204A-204F corresponds to each housing pin 116A-116F disposed in lock housing device 100, where each key pin 204A-204F has a unique length. First end of each key pin 204A-204F is affixed to handle portion 202 of key structure and a second end of each key pin 204A-204F is to contact and apply a force to the second end of each housing pin 116A-116F disposed in lock housing device 100. In this embodiment, each key pin 204A-204F is noncompressible and remains affixed at the first end of handle portion 202 of key structure 200. In another embodiment, each key pin 204A-204F can compress and retract into handle portion 202 of key structure 200, where the first end of each key pin 204A-204F is coupled to a corresponding member disposed in handle portion 202. A spring constant for each of the compressible members disposed in handle portion 202 would be less than a spring constant for each of compressible members 118 disposed in pin enclosure 106, to ensure the compressible members disposed in handle portion 202 compress before compressible members 118 disposed in pin enclosure 106.

Figure 3A:
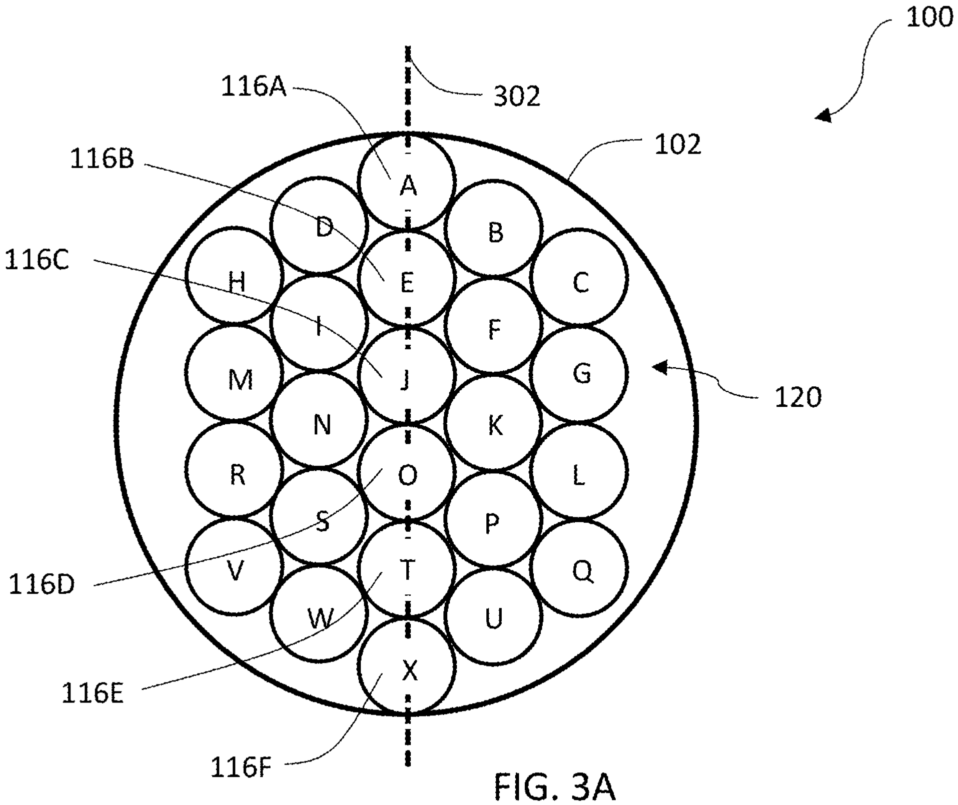
FIG. 3A depicts a front view of pins of a lock housing device, in accordance with an embodiment of the present invention.

FIG. 3A depicts a front view of pins of a lock housing device, in accordance with an embodiment of the present invention. In this embodiment, housing pins 116A-116F are positioned along axis 302 of enclosure 102 of lock housing device 100, where housing pins 116A-116F are surrounded by eighteen other housing pins (total of twenty-four housing pins). Lock housing device 100 is capable of accepting key structure 200 at area 120 in two positions along axis 302, where the two positions are separated by 180 degrees. CPU 108 of lock housing device 100 is able to the two known positions of key structure 200 insertable into lock housing device 100 to authenticate the length at each of the twenty-four housing pins. In another embodiments, a position of housing pins in lock housing device 100 allows for key structure 200 insertion at more than two positions (e.g., at 0 degrees, 90 degrees, 180 degrees and 270 degrees positions). A greater number of housing pins 116 in lock housing device 100 translates to a greater number of lengths that would need to be replicated with a counterfeit key structure 200, thus resulting in a more secure lock housing device 100 and key structure 200 combination. In another embodiment, housing pins 116 can rotate about a center point on axis 302 within enclosure 102 of lock housing device 100 to provide another level of authentication. For example, subsequent to insertion of key structure 200 into lock housing device 100, the user rotates housing pins 116 within enclosure 102 a set amount of degrees (e.g., 15 degrees, 90 degrees) utilizing handle portion 202 of key structure 200.

Figure 3B:
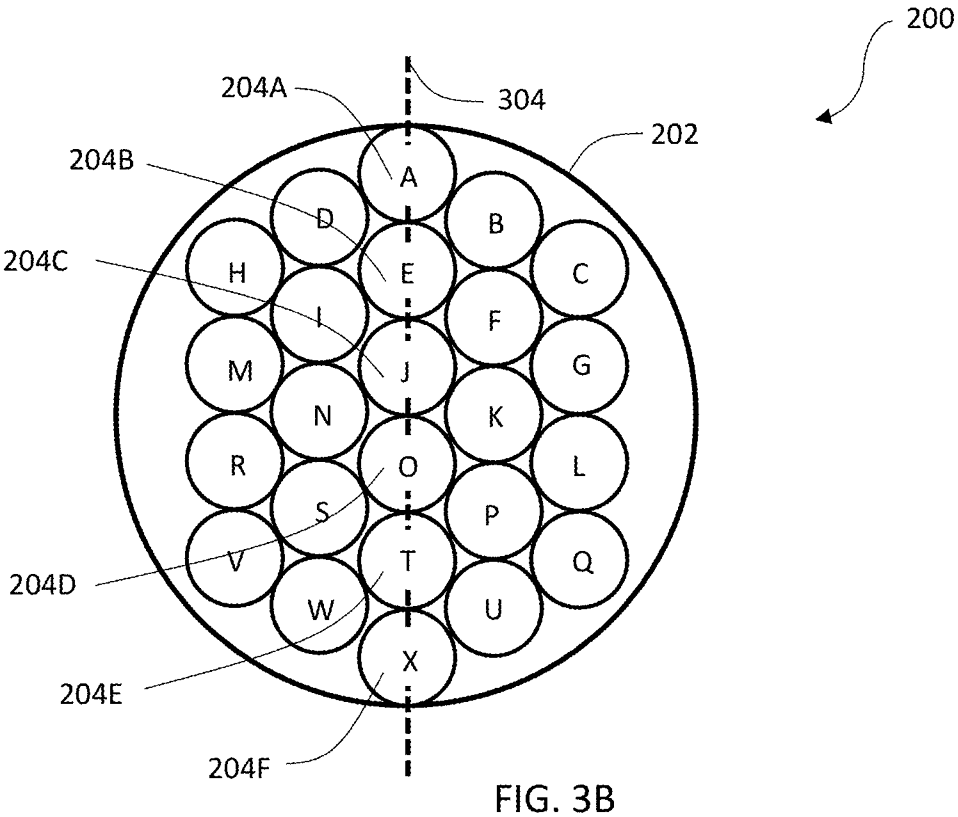
FIG. 3B depicts a front view of pins of a key structure, in accordance with an embodiment of the present invention.

FIG. 3B depicts a front view of pins of a key structure, in accordance with an embodiment of the present invention. In this embodiment, key pins 204A-204F are positioned along axis 304 protruding from handle portion 202 of key structure 200, where key pins 204A-204F are surrounded by eighteen other housing pins (total of twenty-four housing pins). Key structure 200 is insertable into lock housing device 100 in two positions along axis 304, where the two positions are separated by 180 degrees and axis 304 aligns with axis 302, shown in FIG. 3A. In another embodiment, a protection housing can surround all twenty-four key pins 204 to protect key pins 204 from inadvertent damage, while not inserted in lock housing device 100. The protection housing can be cylindrical, octangle, or any shape that would allow for key pins 204 to be position within the area created by the protection housing and corresponding shaped cavity in lock housing device 100 to accept the protection housing during insertion of key structure 200 into lock housing device 100. To assist a user with alignment of key structure 200 with lock housing device prior to insertion, handle portion 202 of key structure 200 can include a protruding alignment member on an exterior surface for aligning with a protruding member positioned on an exterior surface of pin enclosure 106 of lock housing device 100.

Figure 4:
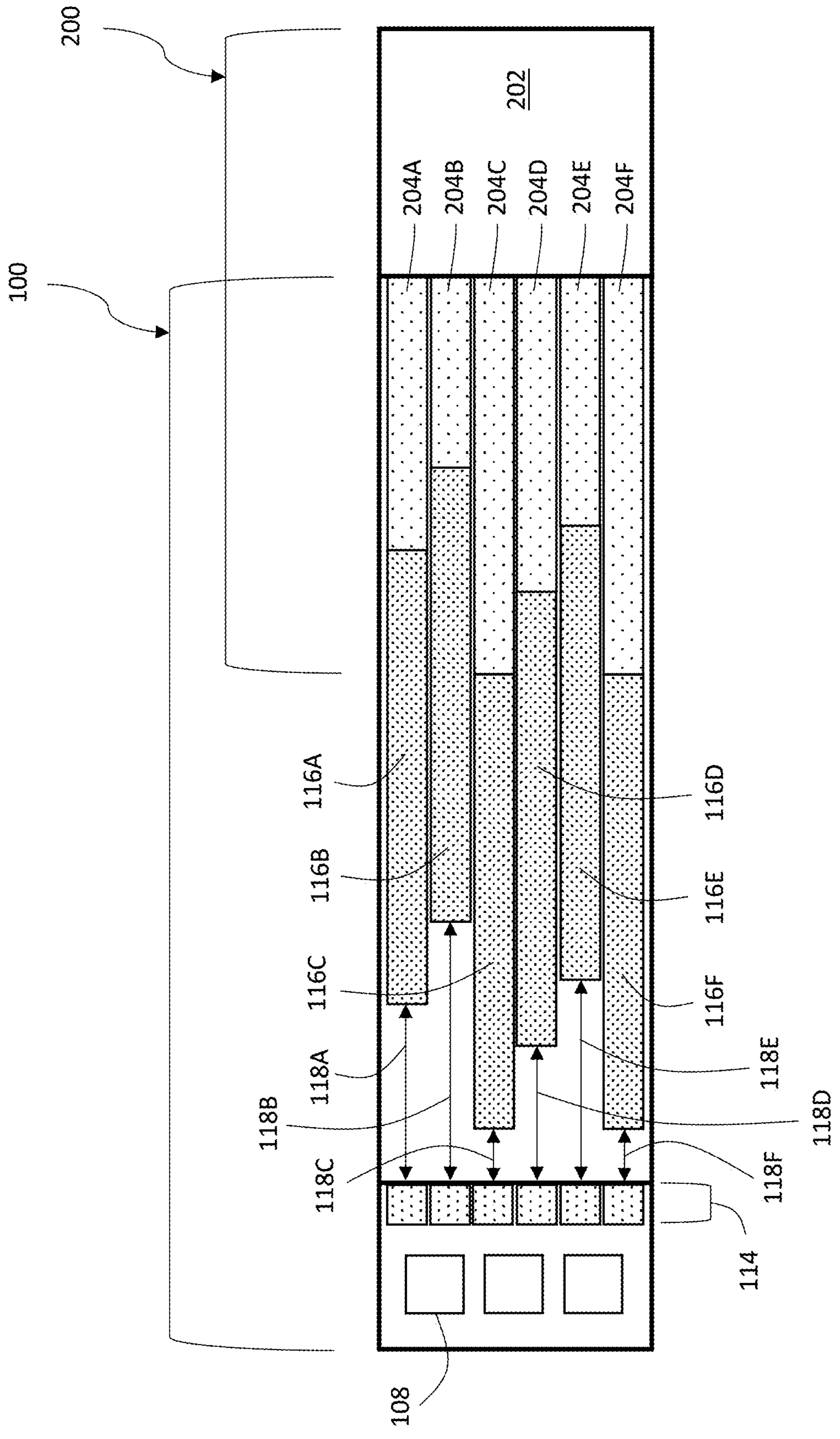
FIG. 4 depicts a side view of a key structure inserted into a lock housing device, in accordance with an embodiment of the present invention.

FIG. 4 depicts a side view of a key structure inserted into a lock housing device, in accordance with an embodiment of the present invention. In this embodiment, key structure 200 is disposed inside lock housing device 100 for length authentication of each housing pin 116 and key pin 204 combination for a total of twenty-four length combinations. As a user inserts key structure 200 inside lock housing device 100, key pins 204C and 204F contact corresponding housing pins 116C and 116F in lock housing device 100. As key structure 200 is inserted further into lock housing device 100, key pin 204D contacts corresponding housing pin 116D, followed by key pin 204A contacting corresponding housing pin 116A, followed by key pin 204E contacting corresponding housing pin 116, and followed by key pin 204B contacting corresponding housing pin 116B. Each of the compressible members 118A-118F are compressed a length equal to a length of each corresponding key pin 204A-204F. A key verification program, discussed in further detail with regards to FIG. 6, operating on CPU 108 utilizes measuring device 114 to determine a compression length for each of the compressed housing pins 116A-116F.

In this embodiment, a length of each key pin 204A-204F subtracted from an initial length of each compressible member 118A-118F, is equal to the compression length of each compressible member 118A-118F. CPU 108 can verify the compression length for each corresponding compressible member 118A-118F due to the interaction between each key pin 204 and housing pin 116 combination and authenticate key structure 200 to the corresponding lock housing device. In another embodiment, where each key pin 204A-204F can also compress and retract into handle portion 202 of key structure 200, the two-stage compression of each key pin 204A-204F provides an additional security layer. The two-stage compression would result in a compression length for each compressible member 118A-118E that results from a length of each key pin 204A-204F and a secondary compression length for each key pin 204A-204F into handle portion 202 of key structure 200.

Figure 5:
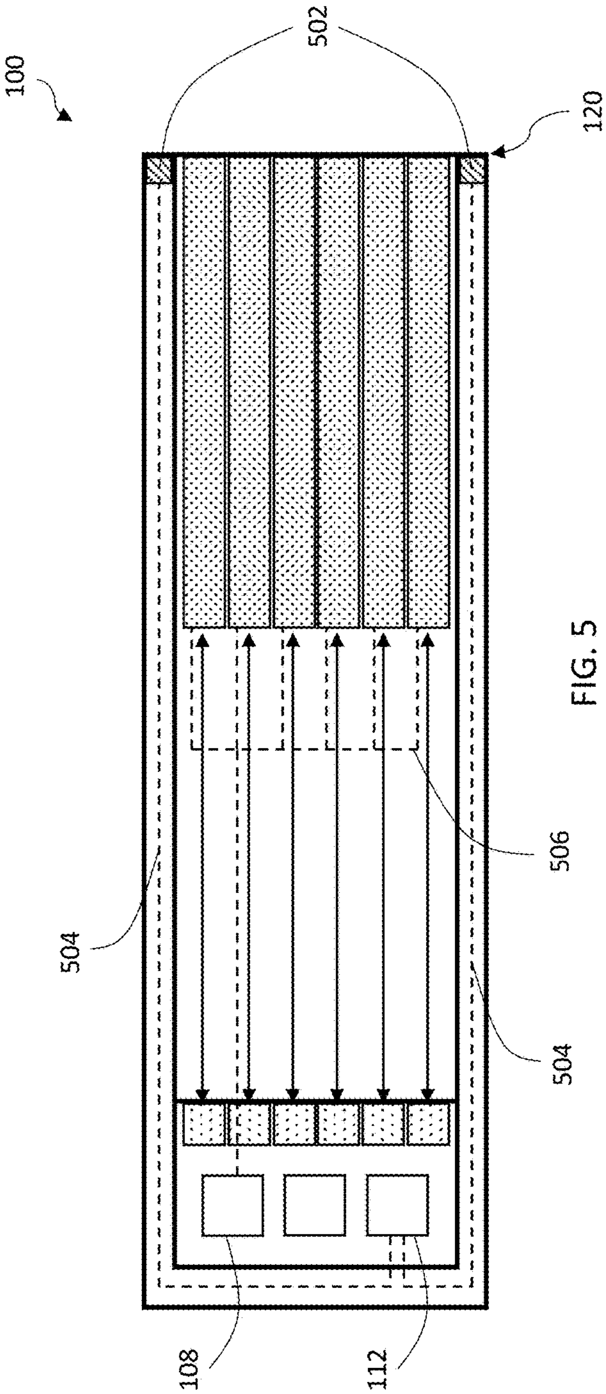
FIG. 5 depicts a side view of a lock housing device with resistance detection, in accordance with an embodiment of the present invention.

FIG. 5 depicts a side view of a lock housing device with resistance detection, in accordance with an embodiment of the present invention. In this embodiment, lock housing device 100 includes a secondary resistance detection for utilization with key structure 200 with key pins 204 of varying metal composition. Lock housing device 100 includes electric housing connectors 502 positioned at area 120, where key structure 200 is insertable into lock housing device 100 at area 120 and electric housing connectors 502 contact corresponding key connectors 602 on key structure 200, discussed in further detail with regards to FIG. 6. Electric housing connectors 502 are electrically coupled to power source 112 via electrical power leads 504 and a first end of each housing pin 116A-116F is grounded to CPU 108 via ground leads 506.

Figure 6:
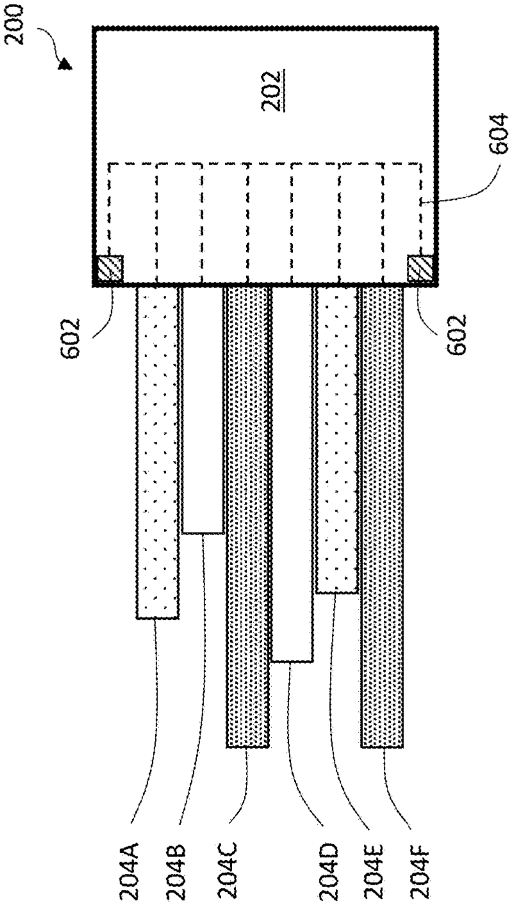
FIG. 6 depicts a side view of a key structure for insertion into a lock housing device with resistance detection, in accordance with an embodiment of the present invention.

FIG. 6 depicts a side view of a key structure for insertion into a lock housing device with resistance detection, in accordance with an embodiment of the present invention. In this embodiment, key structure 200 includes key pins 204A-204F of varying metal composition, where key pins 204A and 204E are composed of metal type A (e.g., aluminum), key pins 204B and 204D are composed of metal type B (e.g., copper), and key pins 204C and 204F are composed of metal type C (e.g., nickel). Key structure 200 includes key connectors 602 positioned on handle portion 202, where a position of key connectors 602 correspond to a position of electric housing connectors 502 of lock housing device 100. Upon insertion of key structure 200 into lock housing device 100, key connectors 602 at least partially electrically couple to electric housing connectors 502. Key connectors 602 are electrically coupled to each key pin 204A-204F via electrical power leads 604, where a current supplied by power source 112 of lock housing device 100 translates to each key pin 204A-204F.

For a first step of an authentication process, a key verification program, discussed in further detail with regards to FIG. 6, operating on CPU 108 utilizes measuring device 114 to determine a compression length for each of the compressed housing pins 116A-116F. For a second step of the authentication process, the key verification program operating on CPU 108 measures resistance for each unique housing pin 116 and key pin 204 combination via a completed circuit between power source 112, electrical power leads 504, electric housing connectors 502, key connectors 602, electrical power lead 604, key pin 204, housing pin 116 (composed on metal material), electric ground lead 506, and CPU 108. Each key pin 204 generates a unique resistance value based on the material composition (i.e., type) and length. CPU 108 sends a signal instructing a locking mechanism to deactivate upon completion of both steps of the authentication process.

The terminology used herein is for the purpose of describing particular embodiments only and is not intended to be limiting to the invention. As used herein, the singular forms "a", "an" and "the" are intended to include the plural forms as well, unless the context clearly indicates otherwise.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiment, the practical application or technical improvement over technologies found in the marketplace, or to enable other of ordinary skill in the art to understand the embodiments disclosed herein. It is therefore intended that the present invention not be limited to the exact forms and details described and illustrated but fall within the scope of the appended claims.

Figure 7:
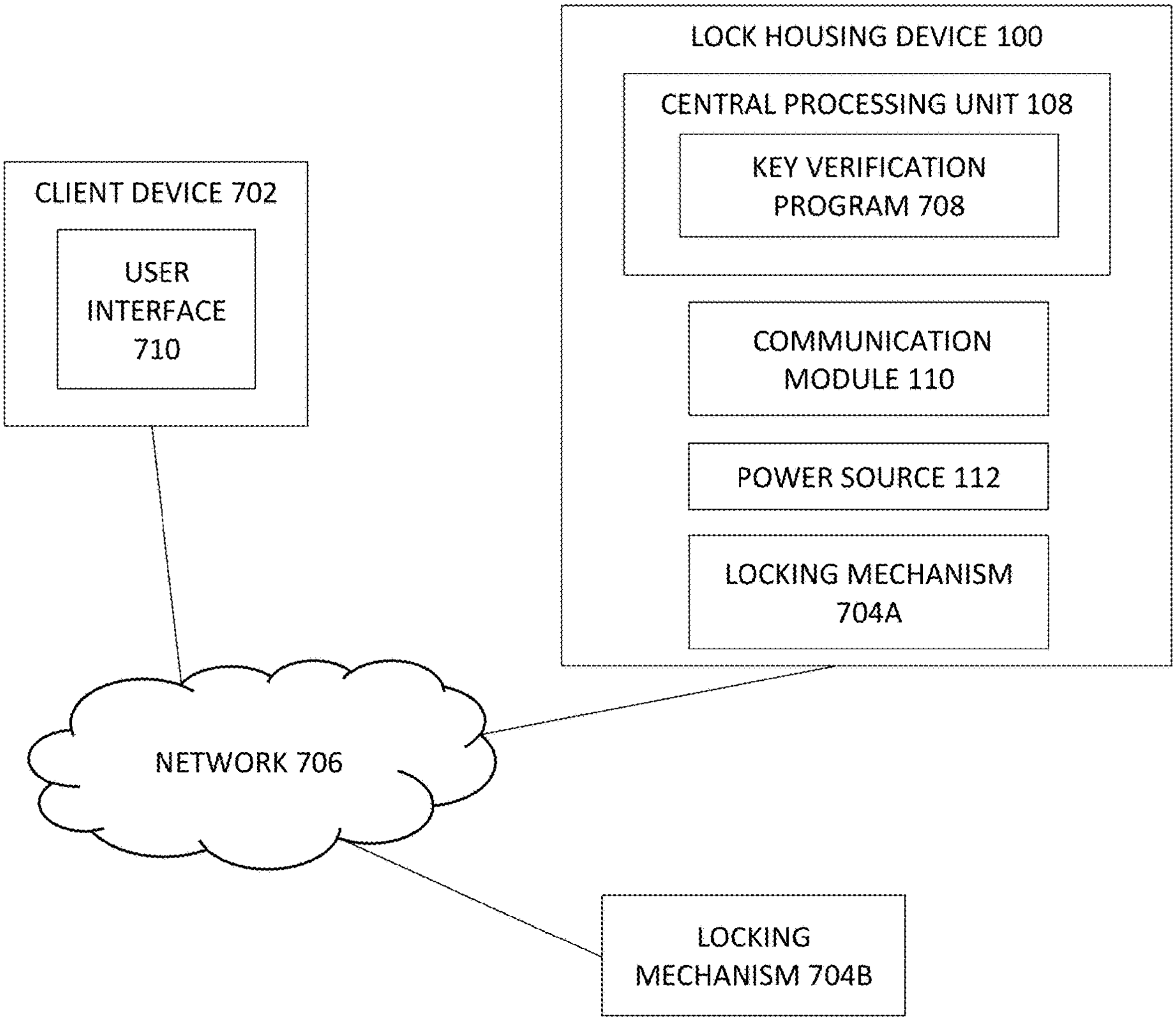
FIG. 7 is a functional block diagram illustrating a distributed data processing environment, in accordance with an embodiment of the present invention.

FIG. 7 is a functional block diagram illustrating a distributed data processing environment, in accordance with an embodiment of the present invention. The distributed data processing environment includes locking housing device 100, client device 702, and locking mechanism 704B, all interconnected over network 706.

As previously discussed with regards to FIGS. 1-6, lock housing device 100 includes central processing unit (CPU) 108, communication module 110, power source 112, locking mechanism 704A, Key verification program 708 operating on CPU 108 perform a one-step authentication process or a two-step authentication process for authenticating key structure 200 (not illustrated in FIG. 7) inserted into lock housing device 100. Communication module 110 allows for CPU 108 to communication with client device 702 and locking mechanism 704B, to send a single indicating whether or not key structure 200 was authenticated. Power source 112 represents one or more types of rechargeable and/or replaceable power reserves for supplying power to CPU 108, communication module 110, and locking mechanism 704A. Locking mechanism 704A represents an electronic lock integrated into lock housing device 100 and locking mechanism 704B represent an electronic lock located external to lock housing device 100, where lock housing device 100 utilizes network 706 to communicate with locking mechanism 704B via communication module 110.

Client device 702 may be a cellphone, smartphone, smartwatch, laptop, tablet computer, or any other electronic device capable of communicating via network 706. In general, client device 702 represents one or more programmable electronic devices or combination of programmable electronic devices capable of executing machine readable program instructions and communicating with other computing devices (not shown) within distributed data processing environment via a network, such as network 706. In one embodiment, client device 702 represents one or more devices associated with a user who is an owner of lock housing device 100. Client device 702 includes user interface 710, where user interface 710 enables a user of client device 702 to interact with key verification program 708 on lock housing device 100.

In general, network 706 can be any combination of connections and protocols that will support communications between lock housing device 100, client device 702, and locking mechanism 706B. Network 706 can include, for example, a local area network (LAN), a wide area network (WAN), such as the internet, a cellular network, a Bluetooth® connection or any combination of the preceding, and can further include wired, wireless, and/or fiber optic connections. In one embodiment, key verification program 708 can be a web service accessible via network 706 to a user of client device 702. In another embodiment, key verification program 708 may be operated directly by a user of lock housing device 100 via user interface (not illustrated in FIG. 7).

Key verification program 708 provides a one-step or two-step authentication of key structures inserted into lock housing device 100. Prior to performing the one-step or two-step authentication process, key verification program 708 instructs locking mechanism 704A and/or 704B to activate (i.e., locked position). Key verification program 708 places CPU 108 into a low power state until key verification program 708 determines lock housing device 100 is contact with a key structure, where the key structure is inserted into lock housing device 100. Key verification program 708 initializes lock housing device by powering on CPU 108 from the low power state and receiving values corresponding to each housing pin, where a compressible member associated with each housing pin of lock housing device 100 is experiencing compression due to a corresponding key pin of the inserted key structure. For the one-step authentication process, the values include a compression length for each housing pin of lock housing device 100. For the two-step authentication process, the values include a compression length for each housing pin of lock housing device 100 and a resistance reading for each housing pin of lock housing device 100, where each housing pin is composed of a unique material type. Responsive to key verification program 708 failing to verify the values for each housing pin of lock housing device 100, key verification program 708 sends a notification to client device 702 associated with user regarding the failed verification. Responsive to key verification program 708 verifying the values for each housing pin of lock housing device 100, key verification program 708 instructs locking mechanism 704A and/or 704B to deactivate (i.e., unlocked position).

Figure 8:
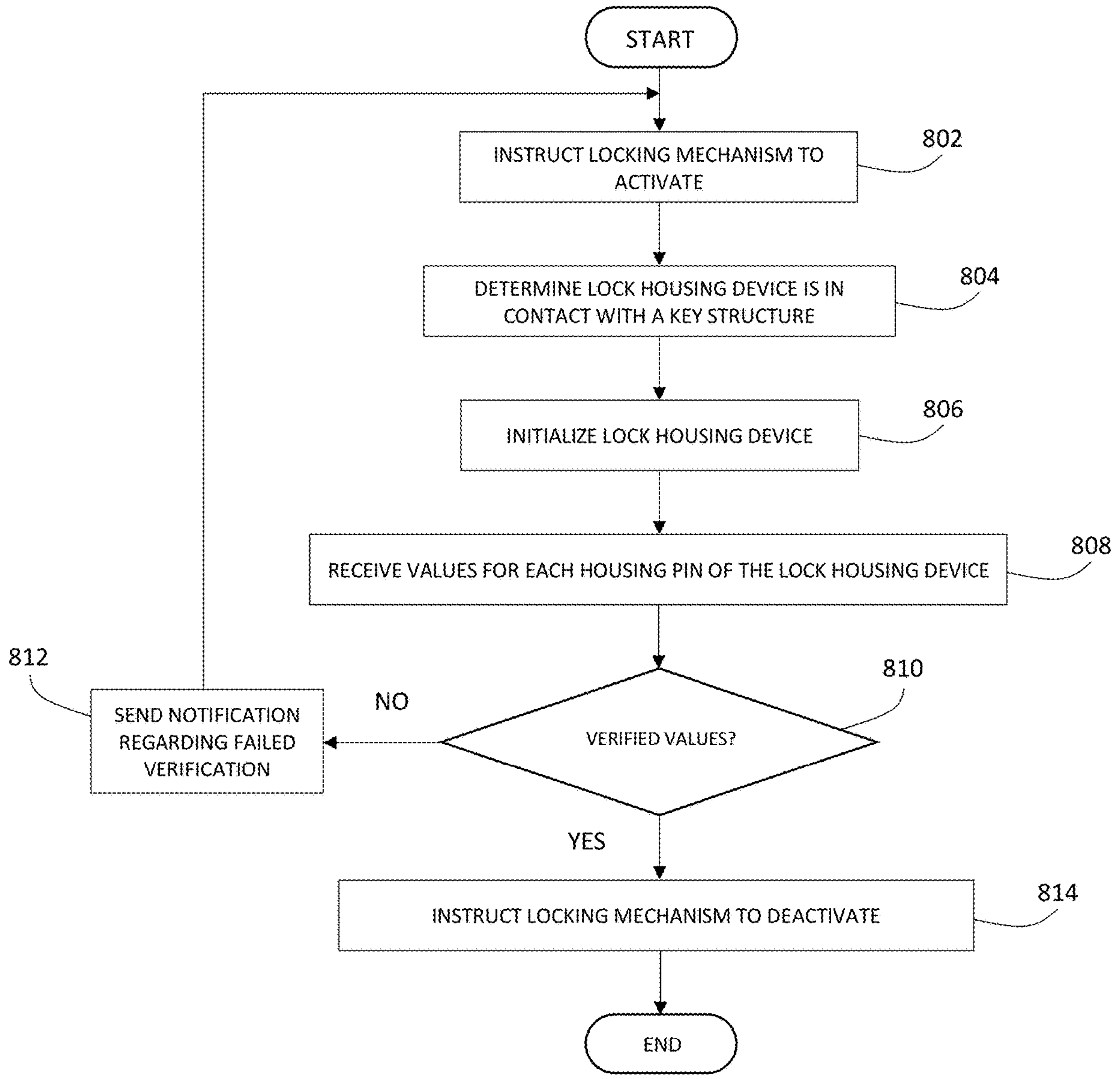
FIG. 8 is a flowchart depicting operational steps of a key verification program for verifying a key structure inserted into a lock housing device, in accordance with one embodiment of the present invention.

FIG. 8 is a flowchart depicting operational steps of a key verification program for verifying a key structure inserted into a lock housing device, in accordance with one embodiment of the present invention.

Key verification program 708 instructs locking mechanism to activates (802). Prior to key verification program 708 performing a one-step or two-step authentication process, key verification program 708 instructs the locking mechanism to activate (i.e., locked position). As previously discussed, the locking mechanism can be integrated into the lock housing device or remote from the lock housing device, where key verification program 708 communicates with the remote locking mechanism via a wireless connection. Key verification program 708 can instruct multiple locking mechanism to activate, where a single lock housing device and key structure combination are utilized for performing the one-step or two-step authentication process for the multiple locking mechanisms. If initial lengths for the compressible member associated with the housing pins of the lock housing mechanism were not previously defined by the manufacture, key verification program 708 measures and establishes the initial length for each compressible member associated with each housing pin of the lock housing device.

Key verification program 708 determines lock housing device is in contact with a key structure (804). In this embodiment, key verification program 708 instructs the lock housing device to operate in a low power state to preserve the power source. During the low power state, key verification program 708 can utilize a motion sensor integrated into the lock housing device to identify movement of at least one compressible member of the lock housing device. Responsive to key verification program 708 identifying movement of at least one compressible member of the lock housing device, key verification program 708 determines the key structure is in contact with the key structure. In another embodiment, key verification program 708 instructs the lock housing device to operate in a low power state to preserve the power source, where key verification program 708 utilizes electric housing connectors on the lock housing device and the key connectors on the key structure to determine when lock housing device is in contact with the key structure. As the key structure is inserted into the lock housing device, the electric housing connectors contact the key connectors and establish a complete circuit between the power source, electrical power leads in the lock housing device, the electric housing connectors, the key connectors, the electrical power leads in the key structure, the key pins, the housing pins, the electric ground leads of the lock housing device, and the CPU, as previously discussed with regards to FIG. 6.

Key verification program 708 initializes the lock housing device (806). In this embodiment, key verification program 708 initializes the lock housing device by removing the lock housing device from the low power state. For a one-step authentication process, key verification program 708 powers on each distance measuring device associated with each compressible member of the lock housing device for measuring a compression length of each compressible member due to a key pin of the key structure pressing against a housing pin of the lock housing device. For a two-step authentication process, in addition to key verification program 708 powering on each distance measuring device, key verification program 708 instructs the power source to send a current through each key pin and housing pin combination to determine a resistance reading for each key pin and housing pin combination.

Key verification program 708 receives values for each housing pin of the lock housing device (808). For the one-step authentication process, key verification program 708 receives a distance value for each key pin and housing pin combination, where each distance value represents a compression length of each compressible member of the lock housing device. For the lock housing device and key structure combination previously described in FIGS. 3A, 3B, and 4, key verification program 708 receives twenty-four distance values for the twenty-four key pin and housing pin combinations. For the two-step authentication process, key verification program 708 receives a distance value for each key pin and housing pin combination, along with a resistance reading for each key pin and housing pin combination. Since, each pin on the lock housing device and key structure has a unique identifier, key verification program 708 can match each received value to each key pin and housing pin combination. For example, as previously discussed and shown in FIGS. 3A and 3B, housing pin "A" and key pin "A" form a first combination out of the twenty-four combination and key verification program 708 receives distance value "20" and resistance value "5" to form a first code "AA205". Housing pin "B" and key pin "B" for a second combination out of the twenty-four combination and key verification program 708 receives distance value "18" and resistance value "4" to form a second code "BB184". Key verification program 708 can receive all twenty-four codes for authentication against the twenty-four known codes. For embodiments where the key structure is insertable into lock housing device at multiple positions, key verification program 708 has the ability to compared codes for the multiple position against the known codes, where there are multiple sets of known codes for the multiple positions.

Key verification program 708 verifies the values (decision 810) by determining whether the received values for each housing pin match known values for each housing pin of the lock housing device. In the event, key verification program 708 fails to verify the values ("no" branch, decision 810), key verification program 708 sends a notification regarding the failed verification (812). In the event, key verification program 708 verifies the values ("yes" branch, decision 810), verification program 708 instructs the locking mechanism to deactivate (814).

Key verification program 708 sends a notification regarding the failed verification (812). In this embodiment, key verification program 708 sends a notification to a client device associated with the owner of the lock housing device regarding the failed authentication of the fail verification of the key structure inserted into the lock housing device. Key verification program 708 can send the notification to the client device utilizing one or more electronic methods (e.g., electronic mail, text message), where the notification can include a time of the failed verification, a date of the failed verification, a step that failed the verification from the two-step verification, and a list of one or more values that did not match the known values for the key pin and housing pin combinations. Key verification program 708 can display in a user interface on the client device a front view of the lock housing device (e.g., FIG. 3A) and the key structure (e.g., FIG. 3B) highlighting the one or more pin combination that include one or more values that failed the verification. Thus, allowing the user to inspect the lock housing device and the key structure for any inadvertent damage that may have occurred to the housing pins and/or the key pins based on the front views that key verification program 708 displays to the user.

Key verification program 708 instructs the locking mechanism to deactivate (814). Key verification program 708 instructs the one or more locking mechanism to deactivate (i.e., unlocked position) by sending a signal to the locking mechanism. As previously discussed, the locking mechanism can be integrated into the lock housing device or remote from the lock housing device, where key verification program 708 communicates with the remote locking mechanism via a wireless connection. Key verification program 708 can instruct multiple locking mechanism to deactivate, where a single lock housing device and key structure combination are utilized for performing the one-step or two-step authentication process for the multiple locking mechanisms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for a lock housing and a key structure, the lock housing and the key structure being for use with a locking mechanism, where the lock housing and the key structure are separate components, the apparatus comprising:

an enclosure of the lock housing, the enclosure extending in a longitudinal direction from a first end of the enclosure to a second end of the enclosure, the enclosure provided with a central processing unit, a power source, a first distance measuring device, at least a first compressible member, and at least a first housing pin disposed in the enclosure, wherein the central processing unit is electrically coupled to the power source and the first distance measuring device;

a first end of the first compressible member is mechanically coupled to a first end of the first housing pin and a second end of the first compressible member is mechanically coupled to an inner surface of the enclosure;

the first distance measuring device positioned at the second end of the first compressible member;

a first key pin of the key structure insertable along the longitudinal direction into an opening in the first end of the enclosure of the lock housing, where a second end of the first housing pin engages with an end of the first key pin, wherein the first end of the first key pin at least partially aligns with the second end of the first housing pin when inserted into the enclosure of the lock housing, such that the first end of the first key pin is configured to press the second end of the first housing pin;

wherein the first compressible member is compressible in the longitudinal direction by the first key pin of the key structure inserting into the enclosure of the lock housing;

wherein the first distance measuring device is configured to measure a first distance from the second end of the first compressible member to the first end of the first housing pin along the longitudinal direction, where a first distance measurable by the first distance measuring device and a distance of insertion of the first key pin is the same as a distance of compression of the first compressible member;

wherein the central processing unit is configured to generate a signal to the locking mechanism based on the first distance measurable by the first distance measuring device.

2. The apparatus of claim 1, wherein the first key pin protrudes from a handle portion of the key structure.

3. The apparatus of claim 1, wherein a first compression length of the first compressible member is equal to a first length of the first key pin of the key structure.

4. The apparatus of claim 1, wherein the first compressible member is a first helical spring.

5. The apparatus of claim 4, wherein the first distance measuring device is a first laser distance measuring device.

6. The apparatus of claim 5, further comprising:

the first laser distance measuring device is positioned at a central axis of the helical spring.

7. The apparatus of claim 1, further comprising:

a first end of a second compressible member is mechanically coupled to a first end of a second housing pin and a second end of the second compressible member is mechanically coupled to the inner surface of the enclosure;

a second distance measuring device positioned at the second end of the second compressible member; and a second key pin of the key structure insertable in the enclosure of the lock housing opposite a second end of the second housing pin, wherein the second compressible by the second key pin of the key structure a first distance measurable by the second distance measuring device, wherein the central processing unit is configured to generate another signal to the locking mechanism based on the first distance measurable by the second distance measuring device, wherein the first distance measurable by the second distance measuring device is different than the first distance measurable by the first distance measuring device.

8. The apparatus of claim 7, further comprising:

a first end of the second key pin at least partially aligns with a second end of the second housing pin, wherein the first end of the second key pin is configured to press the second end of the second housing pin.

9. The apparatus of claim 1, further comprising:

electric housing connectors positioned on the enclosure at an area where the key structure is disposed in the lock housing device, wherein each of the electric housing connectors at least partially aligned with corresponding key connectors on a handle portion of the key structure; and the power source is configured to provide current to the first housing pin via the electric housing connectors, the key connectors, and the first key pin, wherein the first housing pin is grounded to the central processing unit, wherein the central processing unit is configured to generate a signal to the locking mechanism based on a resistance value for the first key pin.

10. The apparatus of claim 9, wherein the first key pin is a metal to that provides a resistance to the current provided by the power source.

11. The apparatus of claim 7, further comprising:

electric housing connectors positioned on the enclosure at an area where the key structure is disposed in the lock housing device, wherein each of the electric housing connectors at least partially aligned with corresponding key connectors on a handle portion of the key structure;

the power source is configured to provide current to the first housing pin via the electric housing connectors, the key connectors, and the first key pin, wherein the first housing pin is grounded to the central processing unit; and the power source is configured to provide current to the second housing pin via the electric housing connectors, the key connectors, and the second key pin, wherein the second housing pin is grounded to the central processing unit, wherein the central processing unit is configured to generate a signal to the locking mechanism based on a resistance value for the second key pin.

12. The apparatus of claim 11, wherein the first key pin is a first metal type and the second key pin is a second metal type.

13. The apparatus of claim 12, wherein the first metal type produces a first resistance different than a second resistance of the second metal type.

14. The apparatus of claim 1, further comprising:

the first key pin of the key structure is mechanically coupled to a second compressible member disposed in a handle portion of the key structure, wherein a second spring constant for the second compressible member is less than a first spring constant for the first compressible member.

* * * * *